United States Patent [19]
Tada

[11] Patent Number: 5,125,384
[45] Date of Patent: Jun. 30, 1992

[54] FUEL CONTROL SYSTEM FOR AN INTERNAL COMBUSTION ENGINE

[75] Inventor: Yasuo Tada, Himeji, Japan

[73] Assignee: Mitsubishi Denki Kabushiki Kaisha, Tokyo, Japan

[21] Appl. No.: 708,279

[22] Filed: May 31, 1991

[30] Foreign Application Priority Data

Aug. 4, 1990 [JP] Japan .................................. 2-207298

[51] Int. Cl.⁵ ............................................. F02D 41/22
[52] U.S. Cl. .................................. 123/479; 364/431.11
[58] Field of Search ................ 123/479; 73/116, 117.3, 73/118.1; 364/431.11

[56] References Cited

U.S. PATENT DOCUMENTS

| | | | |
|---|---|---|---|
| 4,572,143 | 2/1986 | Umesaki et al. | 123/479 |
| 4,615,321 | 10/1986 | Haefner et al. | 123/479 |
| 4,780,826 | 10/1988 | Nakano et al. | 123/479 X |

FOREIGN PATENT DOCUMENTS

| | | |
|---|---|---|
| 113839 | 5/1987 | Japan . |
| 253546 | 10/1989 | Japan . |
| 33446 | 2/1990 | Japan . |

*Primary Examiner*—Tony M. Argenbright
*Attorney, Agent, or Firm*—Sughrue, Mion, Zinn, Macpeak and Seas

[57] ABSTRACT

A fuel control system for an internal combustion engine calculates a first air-fuel ratio based on the output of an air-flow sensor and the injection time of an injector, a second air-fuel ratio based on the suction air quantity from outputs of a throttle opening degree sensor and an engine revolution sensor, and on the injection time of the injector, and a third air-fuel ratio based on the output of an oxygen concentration sensor. A malfunction determiner detects a malfunction of a sensor by comparing the calculated values of the three ratios, and specifies the abnormal sensor when the calculated value based thereon disagrees with those of the other sensors. The throttle opening degree sensor can be replaced with a boost pressure sensor.

2 Claims, 2 Drawing Sheets even when these sensors or actuators are out of order, they are still used as they are so far as the lowering of the system function does not cause major problems in the running of an automobile. In such cases, it has recently been realized that, especially when the exhaust gas purification function is lowered, the system considerably and adversely impacts the environment. Therefore, it has formerly been proposed that a complete malfunction of sensors and actuators should be detected by the snapping of a wire or a short circuit.

FUEL CONTROL SYSTEM FOR AN INTERNAL COMBUSTION ENGINE

BACKGROUND OF THE INVENTION

1. Field of the Invention

This invention relates to a fuel control system for an internal combustion engine utilized in an automobile or the like, and particularly to means for determining malfunctions such as deterioration or damage etc. of various sensors utilized in this system.

2. Discussion of Background

The fuel control system for an internal combustion engine is disclosed, for instance, in Japanese Examined Patent Publication No. 56340/1987, or Japanese Unexamined Patent Publication No. 11383/1987. It is an effective means for the promotion of running performance and efficiency of an engine, as well as exhaust gas purification. In the above fuel control system for an internal combustion engine, as shown in the above patent publications, various sensors such as an air-flow sensor, an oxygen sensor, a revolution sensor, and a boost pressure sensor, and actuators are utilized. When these sensors or actuators are out of order, the performance of the fuel control system is lowered. However, even when these sensors or actuators are out of order, they are still used as they are so far as the lowering of the system function does not cause major problems in the running of an automobile. In such cases, it has recently been realized that, especially when the exhaust gas purification function is lowered, the system considerably and adversely impacts the environment. Therefore, it has formerly been proposed that a complete malfunction of sensors and actuators should be detected by the snapping of a wire or a short circuit.

It has formerly been possible to detect and inform the complete malfunction of sensors and actuators by snapping of a wire or a short circuit, in the fuel control system for an internal combustion engine. However, it has not been possible to detect the deterioration or the damage of functions not as severe as a complete malfunction. Especially, in case of analogue type sensors, it is difficult to detect the lowering of functions. In order to carry out the detection, the only method is to provide the same or the same kind of sensors in plural numbers, which becomes considerably disadvantageous economically.

SUMMARY OF THE INVENTION

It is an object of the present invention to provide a fuel control system for an internal combustion engine embodying an economical and efficient means which can determine the deterioration or the like of the important sensors using only originally necessary sensors, or adding a minimum number of sensors as judgment sensors.

According to an aspect of the present invention, there is provided a fuel control system for an internal combustion engine, having at least an air-flow sensor which detects a suction air quantity, a throttle opening degree sensor which detects a throttle opening degree, an oxygen concentration sensor which detects an oxygen concentration in an exhaust gas, and an engine revolution sensor which detects an engine revolution, adapted to determine a fuel quantity in correspondence with an output of the air-flow sensor, correcting the fuel quantity based on an output of the oxygen concentration sensor, by which an injected quantity of the fuel by an injector is controlled, and adapted to perform fuel control in correspondence with a specified running state based on an output of the throttle opening degree sensor, which comprises:

a first air fuel ratio calculating means for calculating a first air-fuel ratio from the suction air quantity based on an output of the air-flow sensor and a fuel quantity based on an injection time of the injector;

a second air-fuel ratio calculating means for calculating a second air-fuel ratio from a suction air quantity based on an output of the throttle opening degree sensor and an output of the engine revolution sensor, and the fuel quantity based on the injection time of the injector;

a third air-fuel ratio calculating means for calculating a third air-fuel ratio from an output of the oxygen concentration sensor; and malfunction determining means for determining a malfunction of a specific one of the air-flow sensor, the throttle opening degree sensor, and the oxygen concentration sensor, which establishes a disagreed calculated value of an air-fuel ratio, when the value of the air fuel ratio calculated by one of the first, the second, and the third air-fuel ratio calculating means, disagrees with the values of the air-fuel ratios calculated by the other air-fuel ratio calculating means, which is established by comparing the values of the air-fuel ratios calculated by the first, the second, and the third air-fuel ratio calculating means.

According to another aspect of the present invention, there is provided a fuel control system for an internal combustion engine, having at least an air-flow sensor which detects a suction air quantity, an oxygen concentration sensor which detects an oxygen concentration in an exhaust gas, an engine revolution sensor which detects an engine revolution, and a boost pressure sensor which detects a boost pressure in a suction system, adapted to determine a fuel quantity in correspondence with an output of the air-flow sensor, correcting the fuel quantity based on an output of the oxygen concentration sensor, by which a quantity of the fuel injected by an injector is controlled, which comprises: a first air-fuel ratio calculating means for calculating a first air fuel ratio from the suction air quantity based on an output of the air-flow sensor and a fuel quantity based on an injection time of the injector;

a second air-fuel ratio calculating means for calculating a second air-fuel ratio from a suction air quantity based on an output of the boost pressure sensor and an output of the engine revolution sensor, and the fuel quantity based on the injection time of the injector;

a third air-fuel ratio calculating means for calculating a third air-fuel ratio from an output of the oxygen concentration sensor; and determining means for determining a malfunction of a specific one of at least the air-flow sensor and the oxygen concentration sensor, which establishes a disagreed calculated value of the air-fuel ratio, when the value of the air-fuel ratio being calculated by one of the first, the second, and the third air-fuel ratio calculating means, disagrees with calculated values of the air-fuel ratios calculated by the other air-fuel ratio calculating means, which is established by comparing the values of the air-fuel ratios calculated by the first, the second, and the third air-fuel ratio calculating means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
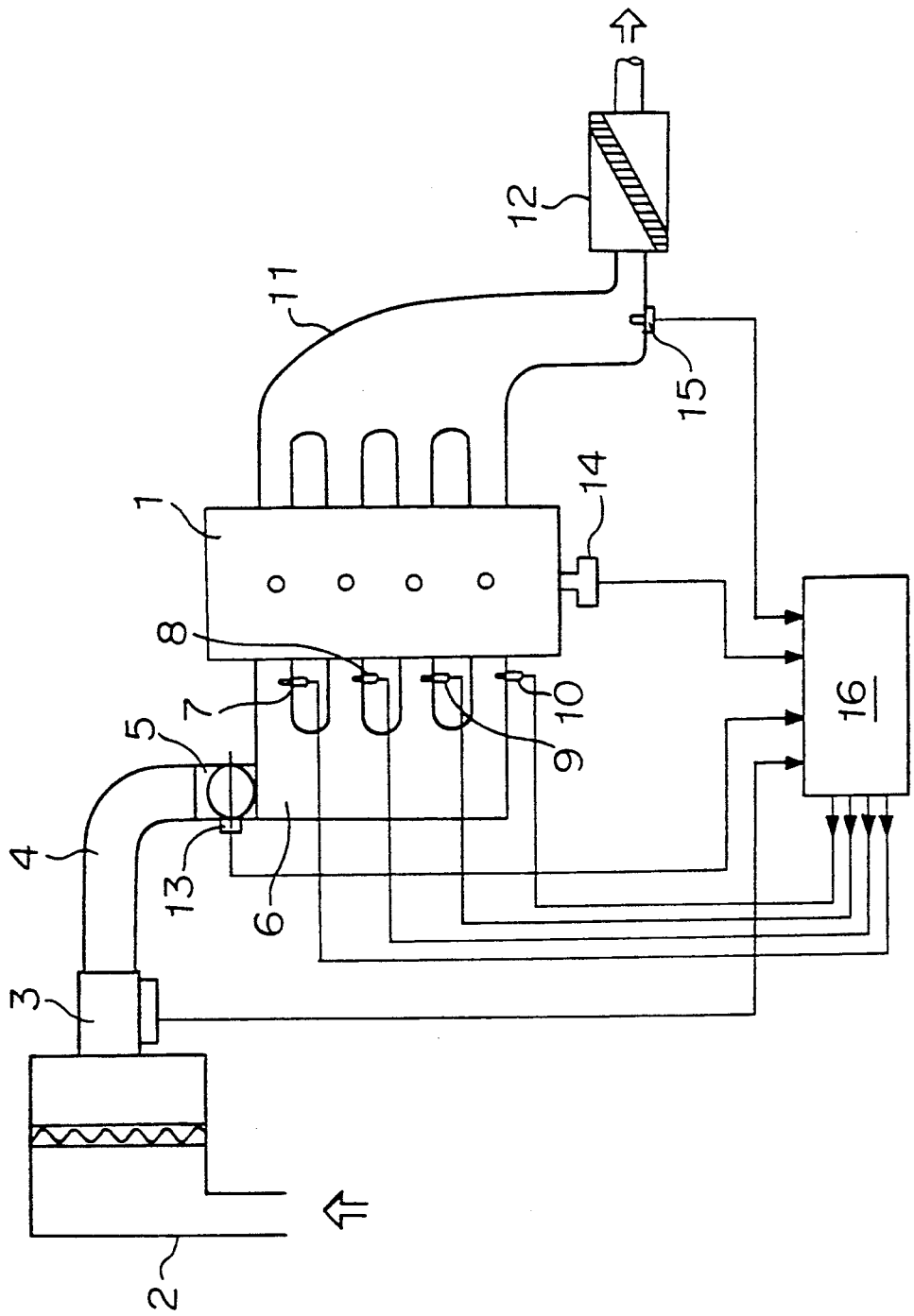
FIG. 1 is a schematic diagram showing an embodiment of a fuel control system of an internal combustion engine according to the present invention.

In FIG. 1, a numeral 1 designates an internal combustion engine, and 2, an air cleaner. A suction pipe 4 is connected to the air cleaner 2 through an air-flow sensor 3. On the downstream side of the suction pipe 4, a throttle body 5 is provided, which is equipped with a throttle valve that moves corresponding to an acceleration pedal, not shown. To the downstream end of the throttle body 5, an intake manifold 6 is connected, which distributes suction air to respective cylinders of the internal combustion engine 1. At branched pipe parts of the intake manifold 6, injectors 7, 8, 9, and 10 for fuel injection, are provided corresponding to the respective cylinders. A catalytic device 12 for exhaust gas purification is connected to the downstream side of an exhaust gas manifold 11 which leads and exhausts exhaust gas from the respective cylinders of the internal combustion engine 1. A muffler, not shown, is connected to the downstream side of the catalytic device 12.

A throttle opening degree sensor 13 is provided for detecting a throttle opening degree (opening degree of a throttle valve) at the throttle body 5. An engine revolution sensor 14 for detecting a revolution of an output shaft is provided for the internal combustion engine 1. Furthermore, an oxygen sensor 15 is provided, for detecting an oxygen concentration in exhaust gas on the entry side of the catalytic device 12.

In FIG. 1, a numeral 16 designates a control device having a microcomputer. The control device 16 receives respective detected signals from the air-flow sensor 3, the throttle opening degree sensor 13, the engine revolution sensor 14, and the oxygen sensor 15, and outputs injection signals to the respective injectors 7 to 10.

In this system, when a driver operates an acceleration pedal, not shown, the throttle valve of the throttle body 5, opens or closes, by which the output of the internal combustion engine 1 increases or decreases. On this occasion, the fuel quantity injected from the injectors 7 to 10 is controlled by a calculation based on outputs of the respective sensors, by which an air-fuel ratio is controlled to achieve promotion of the running efficiency and the exhaust gas purification.

When the throttle valve of the throttle body 5 is opened, air is sucked from the air cleaner 2 corresponding with the opening degree. The suction air quantity is detected by the air-flow sensor 3. The control device 16 calculates the fuel quantity so that the air-fuel ratio becomes a predetermined value corresponding to the detected suction air quantity. The control device 16 outputs an injection signal which drives the respective injectors 7 to 10 during the injection time corresponding to the calculated value of the fuel quantity.

The fuel injected from the injectors 7 to 10 is mixed with air, and the mixture is sucked to the respective combustion chambers of the cylinders. The mixture which is combusted and finished working, becomes exhaust gas, exhausted from the exhaust manifold 11, purified by the catalytic device 12, and discharged from a muffler, not shown.

This fuel control system, on top of the basic function of air-fuel ratio control, has other functions such as the correction control of the air-fuel ratio for the exhaust gas purification based on the output of the oxygen sensor 15 or an idling revolution control based on the output of the throttle opening degree sensor 13 and the engine revolution sensor 14, etc., all of which are controlled by the control device 16.

The air fuel ratio is controlled in the following three ways, in the control device 16, by using output values of the air-flow sensor 3, the oxygen sensor 15, and the throttle opening degree sensor 13, which are installed in the suction and exhaust fluid system.

Firstly, an first air-fuel ratio $(A/F)_1$ is calculated by the following equation (1), from the suction air quantity $A_{AFS}$ detected by the air-flow sensor 3, and the fuel injection quantity $F_{INJ}$ based on injection time of the injectors 7 to 10.

$$(A/F)_1 = A_{AFS}/F_{INJ} \tag{1}$$

Secondly, an second air-fuel ratio $(A/F)_2$ is calculated by the following equation (2), from the suction air quantity $A_{\alpha \text{-} N}$ obtained from outputs of the throttle opening degree sensor 13 and the engine revolution sensor 14, and the fuel injection quantity $F_{INJ}$ of the injectors 7 to 10.

$$(A/F)_2 = A_{\alpha \text{-} N}/F_{INJ} \tag{2}$$

Thirdly a third air-fuel ratio $(A/F)_3$ is calculated by the following equation (3) from the output $V_0$ of the oxygen sensor 15.

$$(A/F)_3 = V_0 \tag{3}$$

As an original function of this system, a basic air-fuel ratio control is performed so that the air-fuel ratio becomes a predetermined value based on the first air-fuel ratio $(A/F)_1$ calculated by the equation (1), and a correction is carried out based on the third air-fuel ratio $(A/F)_3$ calculated by the equation (3).

As stated above each of the air-flow sensor 3, throttle opening degree sensor 13, and the oxygen sensor 15, outputs a factor related to the air-fuel ratio. Since these three factors are interrelated, assuming that a plurality of the three sensors 3, 13, and 15 does not suffer malfunctions simultaneously, a malfunction determination can be performed by detecting an abnormal factor by comparing the air-fuel ratios which utilize respective factors, and specifying the abnormal sensor. The control device 16 performs the malfunction determination of sensors by the following procedure.

Comparison is made among the respective values of the air-fuel ratios of $(A/F)_1$, $(A/F)_2$, and $(A/F)_3$ calculated by the equations (1) to (3).

When $A_{AFS}F_{INJ} = A_{\alpha \text{-} N}/F_{INJ} = V_0$, none of the air-flow sensor 3, throttle opening degree sensor 13 and the oxygen sensor 15, is determined to have a malfunction.

When $A_{AFS}/F_{INJ} = A_{a-N}/F_{INJ} \neq V_0$ the oxygen sensor 15 is determined to have a malfunction.

When $A_{AFS}/F_{INJ} \neq A_{a-N}/F_{INJ} = V_0$, the air-flow sensor 3 is determined to have a malfunction.

When $A_{AFS}/F_{INJ} = V_0 \neq A_{a-N}/F_{INJ}$, the throttle opening degree sensor 13 is determined to have a malfunction.

Accordingly, in this embodiment, the air-fuel ratio $(A/F)_2$ is calculated by the equation (2) as above, utilizing an output of the throttle opening degree sensor 13 which is not originally necessary for the air-fuel ratio control, but which is originally necessary, as a fuel control system, for the other functions such as idling revolution control. By comparing $(A/F)_2$ with the air-fuel ratios $(A/F)_1$ and $(A/F)_3$ calculated respectively by the equations (1) and (3) from outputs of the air-flow sensor 3 and the oxygen concentration sensor 15, which are originally necessary for the air-fuel ratio control, the determination and the information of the malfunction such as deteriorations or damages, etc., of the important sensors which are used for the control of the exhaust gas purification, can easily be performed.

Figure 2:
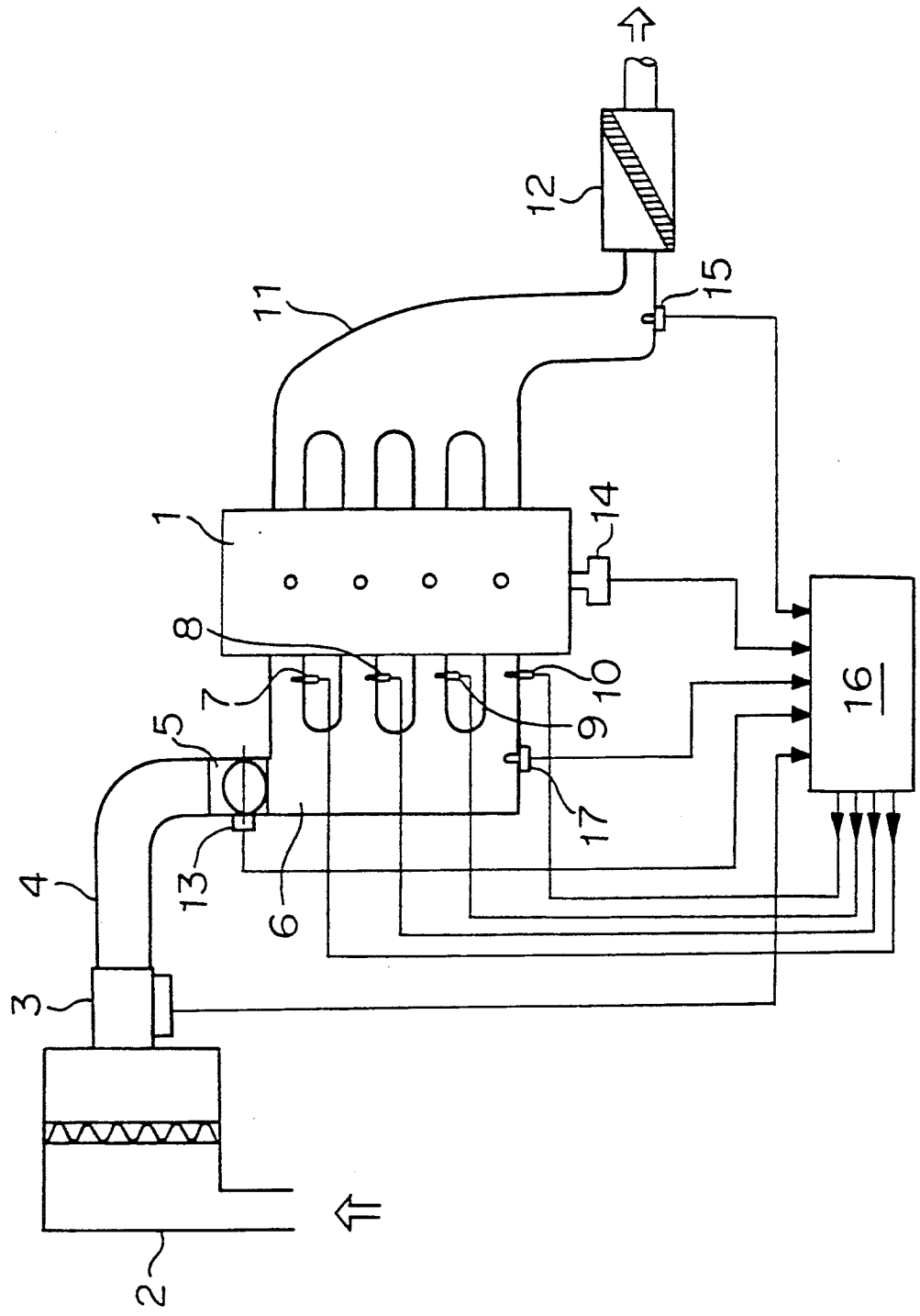
FIG. 2 is a schematic diagram showing another embodiment of a fuel control system for an internal combustion engine according to the present invention.

FIG. 2 is a schematic diagram showing another embodiment of a fuel control system for an internal combustion engine according to the present invention. This embodiment has a construction which is basically no different from the embodiment in FIG. 1. Accordingly the same notations are designated in the drawings as for the parts common to the preceeding embodiment. Hereinafter explanation will be given for the points which are special to this embodiment.

In this embodiment, in addition to the sensors of the preceeding embodiment, a boost pressure sensor 17 which detects the a boost pressure, is provided at the intake manifold 6. This boost pressure sensor 17 is utilized as a sensor for malfunction determination, which enables the malfunction determination of the air-flow sensor 3 and the oxygen sensor 15.

The air-fuel ratio is calculated in the following three ways by using the output values of the air-flow sensor 3, the oxygen sensor 15, and the boost pressure sensor 17.

Firstly, a first air-fuel ratio $(A/F)_1$ is calculated by the above equation (1) from the suction air quantity $A_{AFS}$ detected by the air-flow sensor 3, and the fuel injection quantity $F_{INJ}$ of the injectors 7 to 10 which corresponds to the fuel injection quantity.

Secondly, an second air-fuel ration $(A/F)_2$ is calculated by the following equation (4) from the suction air quantity $A_{S-D}$ obtained from an output of the boost pressure sensor 17 and the engine revolution sensor 14, and the fuel injection quantity $F_{INJ}$ of the injectors 7 to 10.

$$(A/F)_2 = A_{S-D}/F_{INJ} \quad (4)$$

Thirdly, a third air-fuel ratio $(A/F)_3$ is calculated by the above equation (3), from the output $V_0$ of the oxygen sensor 15.

Since the boost pressure sensor 17 outputs a factor which is interrelated with the above air-flow sensor 3 and the oxygen sensor 15, assuming that a plurality of the three sensors 3, 15, and 17 does not suffer malfunctions simultaneously, the malfunction determination of sensors are carried out by the following procedures.

Comparison is made among air-fuel ratios $(A/F)_1$, $(A/F)_2$ and $(A/F)_3$ calculated by the equations (1), (3) and (4).

When $A_{AFS}/F_{INJ} = A_{S-D}/F_{INJ} = V_0$, none of the air flow sensor 3 and the oxygen sensor 15 is determined to have a malfunction.

When $A_{AFS}/F_{INJ} = A_{S-D}/F_{INJ} \neq V_0$, the oxygen sensor 15 is determined to have a malfunction.

When $A_{AFS}/F_{INJ} \neq A_{S-D}/F_{INJ} = V_0$, the air-flow sensor 3 is determined to have a malfunction.

Accordingly, in this embodiment, by adding the boost pressure sensor 17 as an additional sensor for determining malfunction, the air-fuel ratio $(A/F)_2$ is calculated by the equation (4) using an output of the boost pressure sensor 17. By comparing the air-fuel ratio $(A/F)_2$ with the air-fuel ratios $(A/F)_1$ and $(A/F)_3$ which are calculated by the equations 1 and 3 from the outputs of the air-flow sensor 3 and the oxygen concentration sensor 15 which are originally necessary for the air-fuel ratio control, the determination and the information of the malfunction such as deteriorations of or damages to the important sensors which are utilized for the control of the exhaust gas purification, can easily be performed.

Furthermore, in this embodiment, by performing the judgment of $A_{AFS}/F_{INJ} = V_0 \neq A_{S-D}/F_{INJ}$, the determination of malfunction of the boost pressure sensor 17 can be performed.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel control system for an internal combustion engine, having at least an air-flow sensor which detects a suction air quantity, a throttle opening degree sensor which detects a throttle opening degree, an oxygen concentration sensor which detects an oxygen concentration in an exhaust gas, and an engine revolution sensor which detects an engine revolution, adapted to determine a fuel quantity in correspondence with an output of the air-flow sensor, correcting the fuel quantity based on an output of the oxygen concentration sensor, by which an injected quantity of the fuel by an injector is controlled, and adapted to perform fuel control in correspondence with a specified running state based on an output of the throttle opening degree sensor, which comprises:

a first air-fuel ratio calculating means for calculating a first air-fuel ratio from the suction air quantity based on an output of the air-flow sensor and a fuel quantity Based on an injection time of the injector;

a second air-fuel ratio calculating means for calculating a second air-fuel ratio from a suction air quantity based on an output of the throttle opening degree sensor and an output of the engine revolution sensor, and the fuel quantity based on the injection time of the injector;

a third air-fuel ratio calculating means for calculating a third air-fuel ratio from an output of the oxygen concentration sensor; and malfunction determining means for determining a malfunction of a specific one of the air-flow sensor, the throttle opening degree sensor, and the oxygen concentration sensor, which establishes a disagreed calculated value of an air-fuel ratio, when the air-fuel ratio calculated by one of the first, the second, and the third air-fuel ratio calculating means, disagrees with values of the air-fuel ratios calculated by the other air-fuel ratio calculating means, which is established by comparing the values of the air-fuel ratios calculated by the first, the second, and the third air-fuel ratio calculating means.

2. A fuel control system for an internal combustion engine, having at least an air-flow sensor which detects a suction air quantity, an oxygen concentration sensor which detects an oxygen concentration in an exhaust gas, an engine revolution sensor which detects an engine revolution, and a boost pressure sensor which detects a boost pressure in a suction system, adapted to determine a fuel quantity in correspondence with an output of the air-flow sensor, correcting the fuel quantity based on an output of the oxygen concentration sensor, by which a quantity of the fuel injected by an injector is controlled, which comprises:

a first air-fuel ratio calculating means for calculating a first air-fuel ratio from the suction air quantity based on an output of the air-flow sensor and a fuel quantity based on an injection time of the injector;

a second air-fuel ratio calculating means for calculating a second air-fuel ratio from a suction air quantity based on an output of the boost pressure sensor and an output of the engine revolution sensor, and the fuel quantity based on the injection time of the injector;

a third air-fuel ratio calculating means for calculating a third air-fuel ratio from an output of the oxygen malfunction concentration sensor; and determining means for determining a malfunction of a specific one of at least the air-flow sensor and the oxygen concentration sensor, which establishes a disagreed calculated value of the air-fuel ratio, when the air-fuel ratio calculated by one of the first, the second, and the third air-fuel ratio calculating means, disagrees with values of the air-fuel ratio calculated by the other air-fuel ratio calculating means, which is established by comparing the values of the air-fuel ratios calculated by the first, the second, and the third air-fuel ratio calculating means.

* * * * *